United States Patent
Harris

(10) Patent No.: US 6,967,772 B2
(45) Date of Patent: Nov. 22, 2005

(54) SCANNING MICROSCOPE WITH MINIATURE HEAD

(75) Inventor: Martin Russell Harris, Windsor (AU)

(73) Assignee: Optiscan PTY LTD, Notting Hill (AU)

( * ) Notice: Subject to any disclaimer, the term of this patent is extended or adjusted under 35 U.S.C. 154(b) by 0 days.

(21) Appl. No.: 10/265,165

(22) Filed: Oct. 7, 2002

(65) Prior Publication Data
US 2003/0086161 A1 May 8, 2003

Related U.S. Application Data

(63) Continuation-in-part of application No. 09/462,807, filed on Mar. 7, 2000, now abandoned.

(30) Foreign Application Priority Data

Jul. 16, 1997 (AU) .................................. PQ7901

(51) Int. Cl.⁷ .............................................. G02B 21/00
(52) U.S. Cl. ...................... 359/368; 359/196; 359/385; 250/216
(58) Field of Search ............................. 359/368–376, 359/378–390, 205; 73/105; 250/306–310, 250/220.2–220.27

(56) References Cited

U.S. PATENT DOCUMENTS

| | | | |
|---|---|---|---|
| 4,159,863 A | * | 7/1979 | Stewart ........................ 385/33 |
| 4,337,531 A | * | 6/1982 | Willemsen ............... 369/44.15 |
| 5,120,953 A | | 6/1992 | Harris |
| 5,161,053 A | | 11/1992 | Dabbs |
| 5,218,195 A | * | 6/1993 | Hakamata .................... 250/216 |
| 5,323,009 A | | 6/1994 | Harris |
| 5,410,151 A | * | 4/1995 | Buckland ............... 250/227.26 |
| 5,459,564 A | * | 10/1995 | Chivers ...................... 356/73.1 |
| 5,641,896 A | * | 6/1997 | Karrai .......................... 73/105 |
| 5,926,592 A | | 7/1999 | Harris et al. |

* cited by examiner

FOREIGN PATENT DOCUMENTS

GB 2289759 A * 11/1995

OTHER PUBLICATIONS

G.W. Van Santen, Introduction to a Study of Mechanical Vibration, 1958, Cleaver-Hume Press Ltd., 2nd edition, pp. 45-49.*

Primary Examiner—Drew A. Dunn
Assistant Examiner—Mark Consilvio
(74) Attorney, Agent, or Firm—Stites & Harbison PLLC; Douglas E. Jackson

(57) ABSTRACT

The invention provides a scanning microscope comprising: optical fiber for transmitting a light beam to an exit end of the optical fiber proximate light focusing optics, the light focusing optics focusing the light emerging from the exit end to illuminate a point observation field on or within an object to be examined; and a scanner mounted in an optical head casing with the light focusing optics, to cause the illuminated point observation filed to scan over a two-dimensional cross-section of the object such that an image of the object emanated light over the cross-section is constructible. The scanner comprises a forwardly extending vibratable member and a counterbalance coupled thereto, the point observational field is forward the vibratable member, the vibratable member is coupled to the exit end of the optical fiber to provide the fast scan, the counterbalances reactive forces associated with vibration of the vibratable member and the exit end of the optical fiber during operation, and the light focusing optics is mounted in the optical head casing separately from the vibratable member whereby the light emanating from the exit end of the optical fiber is, during operation, scanned across the light focusing optics.

33 Claims, 3 Drawing Sheets

SCANNING MICROSCOPE WITH MINIATURE HEAD

CROSS REFERENCE OF RELATED APPLICATIONS

This application is a Continuation-In-Part of U.S. application Ser. No. 09/462,807 filed on Mar. 27, 2000, now abandoned.

BACKGROUND OF THE INVENTION

1. Field of the Invention

This invention relates to scanning microscopes requiring miniature optical heads, in particular but not limited to laser scanning microscopes with miniature heads which can be utilized as an endoscope.

2. Description of the Related Art

In order to construct a scanning microscope which has an optical head small enough to be inserted in the body to act as an endoscope, whereby internal organs of the body may be inspected at a microscopic level, the optical head of the scanning microscope must be able to be located physically independently of the bulky light source and photo-multiplier tube, and also must be miniaturized.

U.S. Pat. Nos. 5,120,953 and 5,161,053 ("Harris" and "Dabbs" respectively) describe how a confocal microscope may be constructed using optical fibers to make the optical head geometrically independent from the light source and/or detector. Harris and Dabbs further disclose how a single fiber may be used to construct a microscope where the exit end of the fiber acts as both the source pinhole and return pinhole in a confocal microscope.

Harris also describes embodiments where the fiber tip is vibrated to produce a miniature optical head suitable for an endoscope application. One practical problem with such a design is that the scanning accuracy of the system is limited by the kinetic energy transfer to (and losses from) the vibrating components of the scanning mechanism.

An alternative endoscope design remotely locates the scanning apparatus, and transmits the light down a standard endoscopic optical fiber bundle. This can be implemented by positioning the imaging end of the fiber bundle at the microscope stage of a laser scanning confocal microscope, or by using special optical arrangements as described in U.S. Pat. No. 5,323,009. This results at the specimen end of the fiber bundle in a corresponding scanning of the illuminating spot. A disadvantage with such systems is that the optical resolution is limited by the discrete nature of the fiber cores in the endoscopic bundle.

SUMMARY OF THE INVENTION

It is an object of the current invention to provide a miniaturized optical head for a scanning microscope having improved theoretical maximum resolution and reduced vibrational effects.

Therefore in accordance with a broad aspect of the invention there is provided a scanning microscope comprising:

optical transmission means for transmitting a light beam to an exit end of said optical transmission means proximate light focusing means, the light focusing means focusing the light emerging from the exit end to illuminate a point observation field on or within an object to be examined; and a scanner mounted in an optical head casing with said light focusing means, to cause the illuminated point observation field to scan over a two-dimensional cross-section of the object such that an image of the object emanated light over the cross section is constructible;

wherein said scanner comprises a forwardly extending vibratable member and a counterbalance coupled thereto, said point observational field is forward of said vibratable member, said vibratable member is coupled to said exit end of said optical transmission means to provide said fast scan, said counterbalance balances reactive forces associated with vibration of said vibratable member and said exit end of said optical transmission means during operation, and said light focusing means is mounted in said optical head casing separately from said vibratable member whereby said light emanating from said exit end of said optical transmission means is, during operation, scanned across said light focussing means.

Preferably, the scanner scans the point observational field in a raster fashion, the scanner having a fast scanner to scan over rows and a slow scanner operating in a transverse direction to the fast scanner to displace consecutive rows.

The counterbalance may comprise a plurality of counterbalancing elements.

Preferably the scanner includes an optical element located to be vibrated by said vibratable member with said exit end of said optical transmission means to receive light from said exit end and thereby modify the numerical aperture of said optical transmission means. Preferably the optical element is a lens coupled to said vibratable member.

Preferably the lens comprises an air inclusion and meniscus.

In one embodiment, the exit end of the optical transmission means is shaped to provide an optical element to modify the numerical aperture of said optical transmission means. Preferably the optical element is formed by etching (such as by chemical, laser or electric arc) said exit end.

Preferably the optical element is either convex to decrease said numerical aperture or concave to increase said numerical aperture.

In another embodiment, the exit end of said optical transmission means is formed with an oblique face to reduce reflection of light passing through said face.

Preferably the point observational field is in the plane of vibration of said vibratable member. That is, the point observational field is preferably directly forward of the vibratable member rather than just generally forward (i.e. in the volume of space forward of the vibratable member).

Preferably, the scanner and the counterbalance form a resonant system having a Q value sufficiently high to enable low energy input requirements. Preferably too, the Q value is sufficiently low so that perturbations introduced by physical shock do not persist.

Preferably, the microscope comprises a fork with first and second tines, the tines being caused to vibrate by driving means in mutually opposite phases, the vibration of the first and second tines providing the fast scanning and the counterbalance. The exit end of the optical transmission means may be fixed to the first tine so as to follow the vibration of the first tine to provide the fast scanner. Alternatively, a mirror or mirrors may be fixed to the tines or one of the tines in the optical path of the light beam to provide the fast scanner. The tuning fork may be mounted to the optical head casing with a flexible compliant material to further reduce transfer of vibration to the optical head case. The optical transmission means may comprise an optical fiber, and the exit end of the optical transmission means may be the exit end of the core of the optical fiber. The fiber may have a core/cladding composition chosen to have an effective numerical aperture as high as possible and preferably greater than the nominal numerical aperture of 0.12 of current standard fibers. The slow scanner may be provided by movement of the tuning fork in a direction perpendicular to the fast scan vibration, such as by rotation of the tuning fork about an axis.

The microscope may be a confocal microscope. In this case, the optical transmission means may include an optical fiber (which may be single mode) and the object emanated light returning from the illuminated point observational field may return through the focusing means and enter the exit end of the optical fiber, being extracted from the optical fiber by confocal return light separator means. The confocal return light separator means may be an optical fiber coupler or a beam splitter. Additionally, as described in International Application PCT/AU96/00159, the optical transmission means may include near confocal transmission means having a light collection end adjacent the exit end of the confocal transmission means to selectably collect light emanating from regions close to the point observational field. The near confocal transmission means may be provided by the cladding of the single mode optical fiber.

Alternatively, the microscope may be non-confocal. In this case, at least a portion of the object emanated light emanating from the point observational field may be collected and returned via means other than the exit end of the optical transmission means. Such a non-confocal microscope may be adapted to two-photon microscopy.

Preferably, the movement of the slow scanner is damped to reduce coupling of vibration from the fast scanner or from mechanical perturbations to the head.

Preferably, the slow scanner may function by contraction and elongation of a wire whose dimensions are controlled by temperature variation caused by a varying electrical control current through the wire. Alternatively, the slow scanner may function by a hydraulic actuator mechanism connected by a fluid conducting tube to a hydraulic driver pump remotely located which pumps fluid into and out of the hydraulic actuator in the optical head case.

The driving means of the fast scanner may comprise a first electromagnet proximate the first tine and a second electromagnet proximate the second tine, the first and second electromagnets being driven by alternating currents of opposite phase. Energy to maintain the driving means may be delivered to the scanner head by means current-carrying wires or by pulses of electromagnetic radiation conveyed by an optic wave guide. The electromagnetic radiation may be laser pulses conveyed by an optical fiber impinging on a photocell in the head case which supplies current obtained by conversion of the light energy the electromagnets.

A region of the optical fiber proximate the exit end thereof may be manufactured with a reduced cladding diameter to minimize inertia of the first tine in embodiments where the fiber is mounted on the first tine. Alternatively, the inertia may be reduced by (preferably hydrofluoric acid) etching of the region of the fiber proximate the exit end.

In another broad aspect, the invention provides a method of performing scanning microscopy comprising:

transmitting a light beam along optical transmission means to an exit end of said optical transmission means;

focusing the light emerging from the exit end by means of light focusing means to illuminate a point observation field on or within an object to be examined; and scanning said point observational field by means of a scanner mounted in an optical head casing with said light focusing means, to cause the illuminated point observation field to scan over a two-dimensional cross-section of the object such that an image of the object emanated light over the cross section is constructible;

wherein said scanner comprises a forwardly extending vibratable member and a counterbalance coupled thereto, said point observational field is forward of said vibratable member, said vibratable member is coupled to said exit end of said optical transmission means to provide said fast scan, said counterbalance balances reactive forces associated with vibration of said vibratable member and said exit end of said optical transmission means during operation, and said light focusing means is mounted in said optical head casing separately from said vibratable member whereby said light emanating from said exit end of said optical transmission means is, during operation, scanned across said light focussing means.

BRIEF DESCRIPTION OF THE DRAWING

Other preferred features of the invention will be apparent from the following description of preferred embodiments, where.

DETAILED DESCRIPTION OF THE INVENTION

Figure 1:
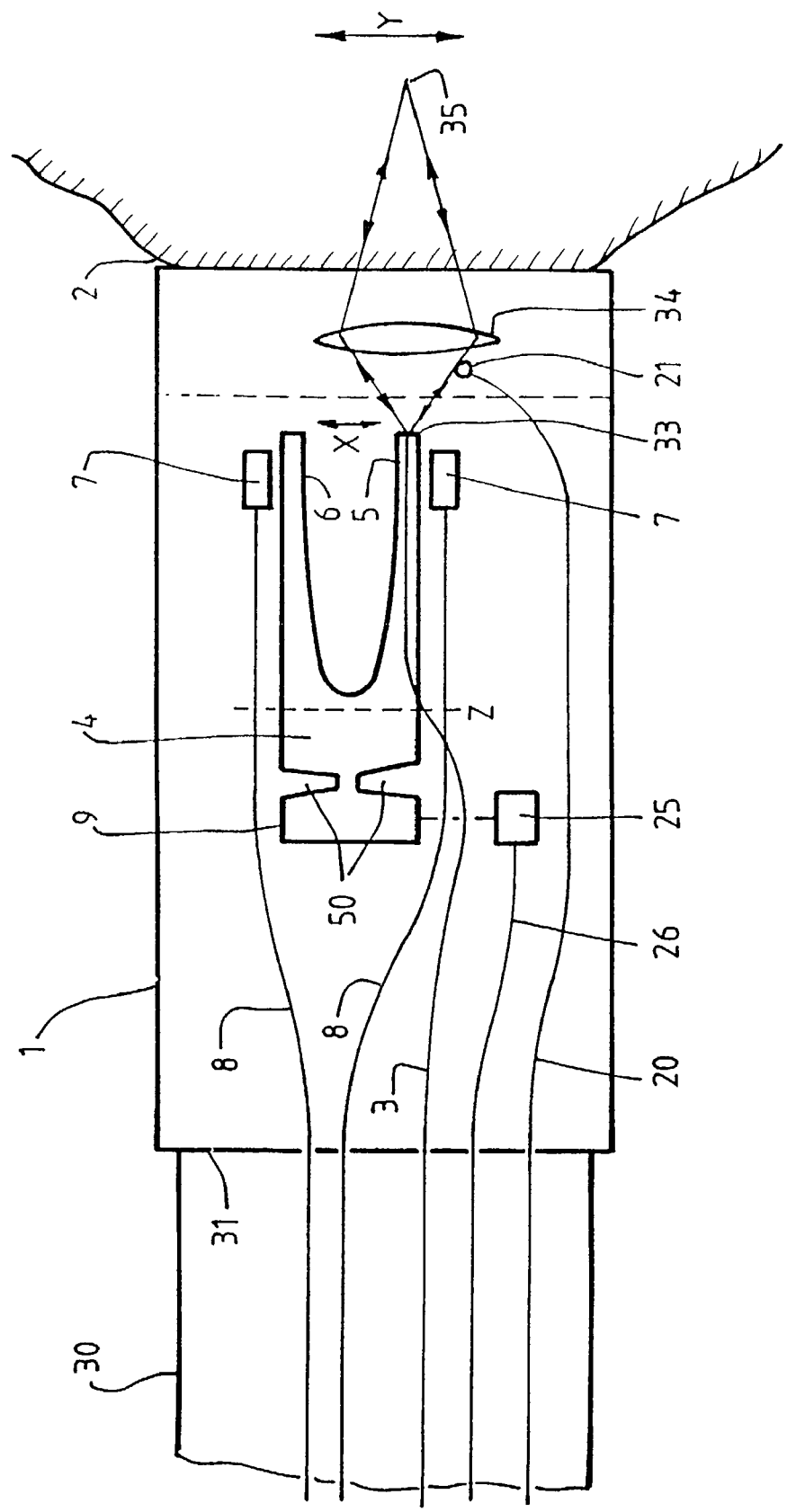
FIG. 1 shows an optical head constructed in accordance with a preferred embodiment of the current invention.

Referring now to FIG. 1 there is shown an optical head case 1 providing an endoscope head shown in juxtaposition to tissue 2 for in vivo observation. Optical transmission means 3 in the form of a single mode optical fiber passes down flexible endoscope tube 30 from a remotely located laser light source, detector and electronics. The remotely located component may be constructed in accordance with the single fiber embodiments described in U.S. Pat. No. 5,120,953 by Harris and need not be repeated here.

The single mode optical fiber passes through a rear wall 31 of the optical head case 1 and an exit end 33 of the optical transmission means 3 is attached to a first tine 5 of a tuning fork 4. The tuning fork 4 has slots 50 in each side to reduce transfer of higher mode vibrations from the tines to the mounting portion 9. The tuning fork 4 is driven by electromagnets 7 so that the first tine 5 and second tine 6 have mutually opposite vibration at a frequency of approximately 1000 Hz. The tines are machined to have as closely matching vibrational states as possible, preferably compensating for any extra inertia introduced by the optical transmission means 3.

The Q value of the vibration should be sufficiently high to allow low energy impulse to the electromagnets 7 but sufficiently low to damp transients caused by physical shocks to the case. The optimal Q value can be determined within these constraints by trial and error. The electromagnets 7 are supplied by sinusoidal or pulsed current through current of opposite phase carrying wires 8. The vibrations of the ends of the tines 5 and 6 have an amplitude less than 1 mm. A portion of the laser light emerging from the fiber tip at the end of the vibrating tine may be used to provide positional feedback by impinging on an optic fiber 20, the tip of which contains a fluorescent material 21 and which partly occludes the laser beam at one side of the emergent cone of light as it scans the lens. The returning fluorescence light passes to a detector at the remote end (not shown), which converts the magnitude of the light signal into an electrical signal. The level of the electrical signal is functionally related to the amount of the fluorescence-doped plastic lying within the cone of illumination, and therefore provides positional feedback to assist in control of the electromagnet 7 to standardize and control the fast scan vibration.

Figure 5:
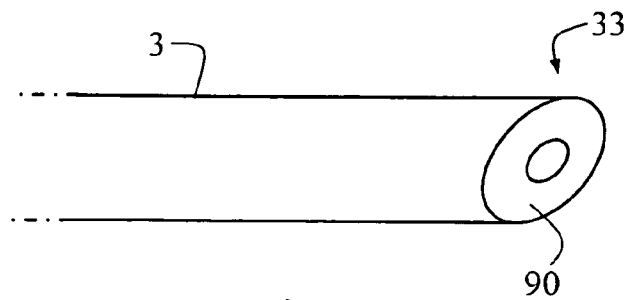
FIG. 5 shows a further embodiment, in which the exit end of the fiber is provided with an oblique face to reduce the reflection of light passing through the face.

Referring to FIG. 5, in a further embodiment of the arrangement of FIG. 1, the exit end 33 of the single mode optical transmission means 3 is formed with an oblique face 90, so that light impinging on the face 90—whether outgoing or return light—does not impinge normally. Outgoing and reflected return light will be single moded, and the oblique face will reduce the proportion of single moded light lost through reflection when passing through the oblique face 90.

Second tine 6 provides the counterbalance to counterbalance the reactive forces of the vibration of the first tine 5. Since additional elements are attached to first tine 5, increasing the mass of that tine, similar compensating masses can be positioned appropriately on second tine 6 to ensure sufficient matching of the counter-balancing with the reactive forces of vibration of the first tine 5. Alternatively, the first and second tines can be machined with the additional elements in place.

The exit end 33 of the optical transmission means projects a cone of illumination on to a light focusing means 34 which focuses the illumination into a diffraction-limited point observational field 35 within the tissue 2. The vibration in the fast scan direction show by arrow X of the first tine 5 is transformed into scanning along a single row across of a two dimensional area within tissue 2 along arrow Y.

The tuning fork 4 is mounted onto the optical head case by anti-vibration mounting means (not shown). This may be interposed at the point of attachment 9 of the tuning fork to the optical head case 1 or it may be integral with the slots 50. The slow scan is provided by reciprocating rotation about an axis Z, preferably located so that the axis of slow scan rotation Z and the axis of fast scan vibration intersect. The rotation is provided by slow scanner 25, actuated by contraction and elongation of "Nitinol" wire, controlled by a second current carrying wire 26, through which a current is passed in a varying level to provide the slow scan reciprocation.

Further reduction in the inertia of the first time may be achieved by hydrofluoric acid etching of a portion of the optical fiber 3 proximate the exit end, whereby a portion of the cladding has been reduced in diameter to reduce the inertia of the fiber.

Alternatively, the etching of the fiber may be in the form of a gradual taper, which has an additional benefit that the numerical aperture of the exit end of the fiber is thereby increased, allowing a reduction in the distance of the focusing optics 34 from the exit end 33.

It has been found that by providing a fast scan mechanism which has counterbalancing movements to balance the fast scan vibrations, transfer of vibrations to the optical head case 1 can be minimized, thereby improving the quality of the image produced.

In another preferred embodiment, a scanning endoscope is provided that is comparable to that shown in FIG. 1, but additionally provided with a further optical element to alter the numerical aperture of optical fiber 3.

Figure 2:
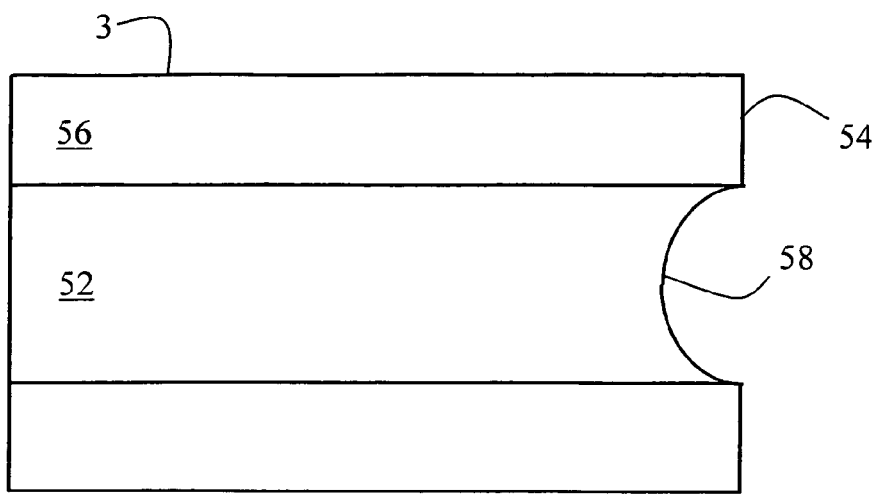
FIG. 2 shows a further embodiment, in which the exit end of the core of the fiber is provided with a concavity to increase the numerical aperture of the fiber.

Thus, referring to FIG. 2, the end of fiber 3 can be etched with hydrofluoric acid to etch away some of the doped core 52 at its exit end 54. The doped core 52 will be preferentially etched (relative to cladding 56). The cladding 56 in this figure is not shown to scale.

It is envisaged that the core 52—with a diameter of approximately 5 $\mu$m—would be etched to a depth of about 1 $\mu$m, and thereby provide an optical element in the form of concavity 58. The core 52 is preferentially etched by the acid owing to its doping.

The concavity 58 increases the numerical aperture of the fiber 3. This can also be achieved (and is more clearly seen) in the embodiment of FIG. 3. In this embodiment, a concavity is provided at the exit end 60 of the fiber 3 by locating an optical element in the form of a BK7 glass spacer 62 of diameter essentially equal to that of fiber 3. A hemispherical concavity 64 is formed in the forward face 66 of the spacer 62 of depth (i.e. radius) approximately 60 $\mu$m. The deepest point 68 of concavity 64 is therefore approximately 100 $\mu$m forward of the exit end 60 of fiber 3.

Light emerging from the core of fiber 3 spreads out into a cone, and this cone is further spread by the spacer 62 so that each ray is transmitted at a greater angle to the optical axis 70 of the fiber 3. It is estimated that such a configuration can increase the numerical aperture from 0.2 to 0.3, and to introduce less than 0.2 waves spherical aberration for wavelengths of between 450 and 550 nm.

Figure 4:
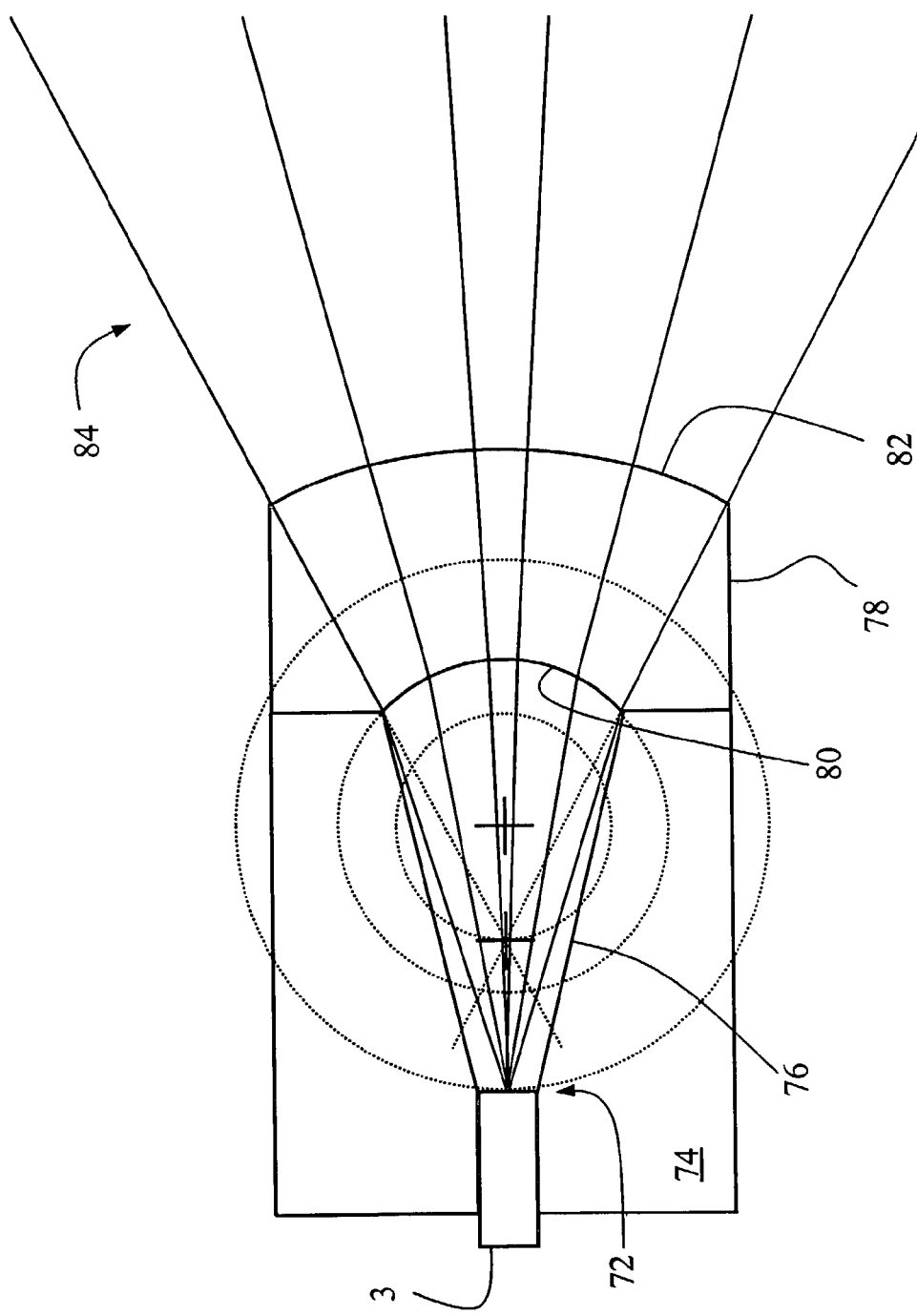
FIG. 4 shows a further embodiment, in which the exit end of the core of the fiber is located in a spacer and provided with a meniscus to increase the numerical aperture of the fiber.

In a further embodiment, an air inclusion and meniscus are located forward of the exit end of the fiber 3, also in order to increase the numerical aperture of the fiber 3. Referring to FIG. 4, the exit end 72 of the fiber 3 is encased in a cylindrical BK7 glass spacer 74 (attached as before to the vibrated tine 5), in whose interior is a conical volume 76. Conical volume 76 has a narrow base matched to the area of the fiber 3, and a larger forward end to allow a sufficient amount of the light exiting the fiber 3 to escape. The spacer 74 is surmounted—at its forward end—by a BK7 glass diverging lens 78 comprising a hemispherical, concave air inclusion 80 (in the rearward face of the lens 78) and a convex, forwardly directed aplanatic meniscus 82. The lens 78 thereby forms a optical element that increases the numerical aperture of the fiber 3. The air inclusion 80 has a radius of curvature of 0.397 mm. The aplanatic meniscus 82 of the lens 78 has a radius of curvature of 1.158 mm.

The cylindrical spacer 74 extends forward from the exit end 72 of the fiber 3 by 0.89 mm, while the forward-most point of the air inclusion 80 in lens 78 is 1.0 mm forward of the exit end 72. The forward-most point of the meniscus 82 of the lens 78 is 1.50 mm forward of the exit end 72.

Optionally, the spacer 74 and lens 78 can be provided integrally.

Consequently, light rays 84 emerging from the lens 78 apparently radiate from a point forward of the exit end 72 of the fiber 3 and at the center of curvature of the meniscus 82 (inside the conical volume 76), effectively increasing the numerical aperture of the fiber.

Figure 3:
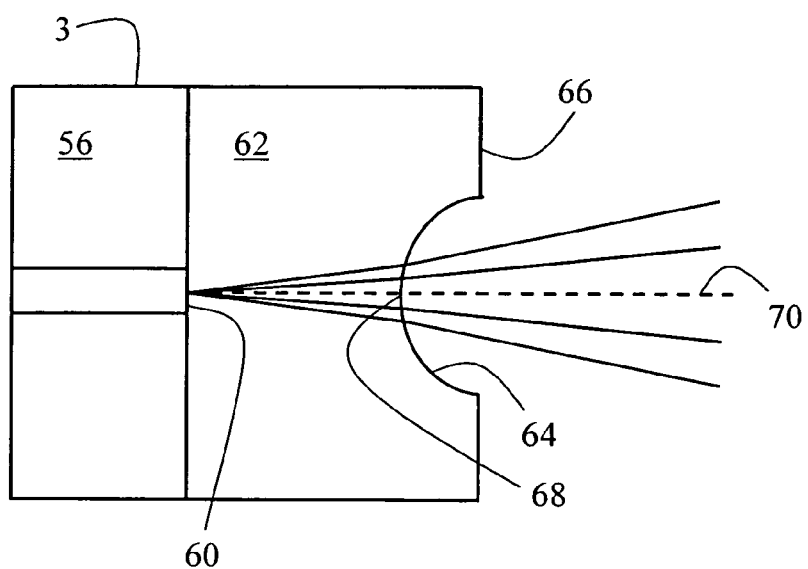
FIG. 3 shows a further embodiment, in which the exit end of the core of the fiber is provided with a spacer with a concavity to increase the numerical aperture of the fiber.

This embodiment should perform comparably to that of FIG. 3, but without spherical aberration.

Modifications may be made to the invention as would be apparent to a person skilled in the art of scanning microscope design. For example, the scope of the invention is not limited to confocal arrangements, and suitably miniaturized heads may be provided which make use of two photon fluorescence, which does not require a confocal return of illumination. Additionally, in the embodiment of FIG. 1, the cladding of the fiber 3 can be used to return near-confocal light, as described in PCT/AU96/00159. However, in this case, etching of the exit end of the fiber to reduce inertia may need to be performed so as to produce a step rather than a taper. The use of a specially produced fiber with reduced diameter cladding, of total glass diameter about 25 microns, is also contemplated. Further still, the provision of current-carrying wires 8 to drive electromagnets 7 may be avoided by the use of an optical wave guide in the place of the current-carrying wires, which projects light onto a photo detector within the head case 1 converting the light energy into electrical energy to energize the electromagnet 7. The second current-carrying wire 26 may similarly may be replaced by a hydraulic connection to operate an alternate hydraulic slow scan mechanism. In this manner, electrical connections passing down the flexible endoscope tube 30 may be avoided.

These and other modifications may be made without departing from the ambit of the current invention, the nature of which can be ascertained from the foregoing description and the drawing.

I claim:

1. A scanning microscope comprising:
   optical transmission means for transmitting a light beam to an exit end of said optical transmission means proximate light focusing means, the light focusing means focusing the light emerging from the exit end to illuminate a point observation field on or within an object to be examined; and
   a scanner mounted in an optical head casing with said light focusing means, to cause the illuminated point observation field to scan over a two-dimensional cross-section of the object in a raster fashion, the scanner having a fast scanner to scan over rows and a slow scanner operating in a transverse direction to the fast scanner to displace consecutive rows, such that an image of object emanated light over the cross section is constructible;
   wherein said scanner comprises a fork with a first tine comprising a longitudinally extending vibratable member and a second tine coupled to said first tine for providing a counterbalance thereto, said first and second tines are operable to vibrate by driving means in mutually opposite phases, said fast scanner and said counterbalance are provided by vibration of said first and second tines, said slow scanner is provided by rotation of said fork perpendicular to said fast scan vibration about an axis parallel to the direction of said fast scan vibration, said first tine has a forward longitudinal end adjacent said light focusing means, said point observational field is longitudinally forward of the longitudinal end of said first tine, said first tine is coupled to said exit end of said optical transmission means to provide a fast scan, said second tine balances reactive forces associated with vibration of said first tine and said exit end of said optical transmission means during operation, and said light focusing means is mounted in said optical head casing separately from said first tine whereby said light emanating from said exit end of said optical transmission means is, during operation, scanned across said light focussing means.

2. A scanning microscope as claimed in claim 1, including an optical element located to be vibrated by said first tine with said exit end of said optical transmission means and located to receive light from said exit end and thereby modify the numerical aperture of said optical transmission means.

3. A scanning microscope as claimed in claim 2, wherein said optical element is a lens coupled to said first tine.

4. A scanning microscope as claimed in claim 3, wherein said lens comprises an air inclusion and meniscus.

5. A scanning microscope as claimed in claim 1, wherein said exit end of said optical transmission means is shaped to provide an optical element to modify the numerical aperture of said optical transmission means.

6. A scanning microscope as claimed in claim 5, wherein said optical element is formed by etching said exit end.

7. A scanning microscope as claimed in claim 5, wherein said optical element is either convex to decrease said numerical aperture or concave to increase said numerical aperture.

8. A scanning microscope as claimed in claim 1, wherein said exit end of said optical transmission means is formed with an oblique face to reduce reflection of light passing through said face.

9. A scanning microscope as claimed in claim 1, wherein said point observational field is in the plane of vibration of said first tine.

10. A scanning microscope as claimed in claim 1, wherein said scanner including said second tine forms a resonant system having a Q value sufficiently high to enable low energy input requirements, owing to high input energy absorbance into resonant oscillation.

11. A scanning microscope as claimed in claim 10, wherein said Q value is sufficiently low such that said oscillation has a broad resonance band so that perturbations introduced by physical shock are less likely to perturb said oscillation out of said resonance band and are therefore less likely to persist.

12. A scanning microscope as claimed in claim 1, wherein said exit end of the optical transmission means is fixed to said first tine so as to follow the vibration of said first tine to provide said fast scanner.

13. A scanning microscope as claimed in claim 1, wherein said microscope includes a mirror or mirrors fixed either to said tines or to one of said tines in an optical path of the light beam to provide said fast scanner.

14. A scanning microscope as claimed in claim 1, wherein said fork is mounted to the optical head casing with a flexible compliant material to further reduce transfer of vibration to the optical head casing.

15. A scanning microscope as claimed in claim 1, wherein said optical transmission means comprises an optical fiber with a core, and the exit end of the optical transmission means forms the exit end of the core of the optical fiber.

16. A scanning microscope as claimed in claim 15, wherein said fiber has a core/cladding composition chosen to have an effective numerical aperture as high as possible.

17. A scanning microscope as claimed in claim 16, wherein said effective numerical aperture is greater than the nominal numerical aperture of 0.12 of current standard fibers.

18. A scanning microscope as claimed in claim 1, wherein said microscope is a confocal microscope.

19. A scanning microscope as claimed in claim 18, wherein said optical transmission means comprises an optical fiber.

20. A scanning microscope as claimed in claim 18, arranged so that said object emanated light returning from the illuminated point observational field returns through said focusing means and enters said exit end.

21. A scanning microscope as claimed in claim 1, wherein said optical transmission means includes near confocal transmission means having a light collection end adjacent to said exit end of said optical transmission means to selectably collect light emanating from regions close to the point observational field.

22. A scanning microscope as claimed in claim 21, wherein said optical fiber is single moded and said near confocal transmission means is provided by the cladding of said single mode optical fiber.

23. A scanning microscope as claimed in claim 1, wherein said microscope is non-confocal.

24. A scanning microscope as calmed in claim 23, wherein said microscope is arranged so that at least a portion of said object emanated light emanating from the point observational field is collected and returned via means other than the exit end of the optical transmission means.

25. A scanning microscope as claimed in claim 24, wherein said microscope is adapted to two-photon microscopy.

26. A scanning microscope as claimed in claim 1, wherein movement of said slow scanner is damped to reduce coupling of vibration from the fast scanner or from mechanical perturbations to the head casing.

27. A scanning microscope as claimed in claim 1, wherein said slow scanner is operable to function by contraction and elongation of a wire whose dimensions are controlled by temperature variation caused by a varying electrical control current through the wire.

28. A scanning microscope as claimed in claim 1, wherein said slow scanner is operable to function by a hydraulic actuator mechanism connected by a fluid conducting tube to a hydraulic driver pump remotely located which pumps fluid into and out of the hydraulic actuator in the optical head casing.

29. A scanning microscope as claimed in claim 1, wherein said driving means of the fast scanner includes a first electromagnet proximate said first tine and a second electromagnet proximate said second tine, the first and second electromagnets being driven by alternating currents of opposite phase.

30. A scanning microscope as claimed in claim 1, wherein energy to maintain the driving means is delivered to the optical head casing by means of current-carrying wires or by pulses of electromagnetic radiation conveyed by an optic wave guide.

31. A scanning microscope as claimed in claim 15, wherein inertia of said first tine is reduced by etching a region of the fiber proximate said exit end.

32. A scanning microscope as claimed in claim 15, wherein inertia of said first tine is reduced by hydrofluoric acid etching of a region of said fiber proximate said exit end.

33. A method of performing scanning microscopy comprising:

transmitting a light beam along optical transmission means to an exit end of said optical transmission means;

focusing the light emerging from the exit end by means of light focusing means to illuminate a point observation field on or within an object to be examined; and scanning said point observational field by means of a scanner mounted in an optical head casing with said light focusing means, to cause the illuminated point observation field to scan over a two-dimensional cross-section of the object in a raster fashion, the scanner having a fast scanner to scan over rows and a slow scanner operating in a transverse direction to the fast scanner to displace consecutive rows, such that an image of object emanated light over the cross section is constructible;

wherein said scanner comprises a fork with first tine comprising a longitudinally extending vibratable member and a second tine coupled to said first tine for providing a counterbalance thereto, said first and second tines are operable to vibrate by driving means in mutually opposite phases, said fast scanner and said counterbalance are provided by vibration of said first and second tines, said slow scanner is provided by rotation of said fork perpendicular to said fast scan vibration about an axis parallel to the direction of said fast scan vibration, said first tine has a forward longitudinal end adjacent said light focusing means, said point observational field is longitudinally forward of the longitudinal end of said first tine, said first tine is coupled to said exit end of said optical transmission means to provide a fast scan, said second tine balances reactive forces associated with vibration of said first tine and said exit end of said optical transmission means during operation, and said light focusing means is mounted in said optical head casing separately from said first tine whereby said light emanating from said exit end of said optical transmission means is, during operation, scanned across said light focussing means.

* * * * *

UNITED STATES PATENT AND TRADEMARK OFFICE
CERTIFICATE OF CORRECTION

PATENT NO. : 6,967,772 B2
APPLICATION NO. : 10/265165
DATED : November 22, 2005
INVENTOR(S) : Harris Page 1 of 1

It is certified that error appears in the above-identified patent and that said Letters Patent is hereby corrected as shown below:

On the Cover page, under the heading Related U.S. Application Data it should read:
    (63)    Continuation-in-part of application No. 09/462,807, filed on Mar. "7" --27--, 2000, now abandoned --, which is the National Stage of International Application No. PCT/AU98/00561, filed 16 July 1998--.

Column 1, line 9 should read:
   abandoned --, which is the National Stage of International Application No. PCT/AU98/00561, filed 16 July 1998 --.

Signed and Sealed this

Twenty-third Day of January, 2007

JON W. DUDAS
*Director of the United States Patent and Trademark Office*